United States Patent
Sundqvist

[11] 3,887,199
[45] June 3, 1975

[54] PRESSURE MEDIUM OPERATED FRICTIONLESS SEAL ASSEMBLY

[75] Inventor: Yngve Bertil Sundqvist, Partille, Sweden

[73] Assignee: SKF Industrial Trading and Development Company B.V., Amsterdam, Netherlands

[22] Filed: Dec. 19, 1973

[21] Appl. No.: 426,281

[30] Foreign Application Priority Data
Dec. 22, 1972 Sweden.......................... 16855/72

[52] U.S. Cl. .................................. 277/74; 277/3
[51] Int. Cl. ...................... F16j 15/24; F16j 15/40
[58] Field of Search ............. 277/3, 15, 27, 28, 59, 277/68, 69, 71–79, 135

[56] References Cited
UNITED STATES PATENTS

| | | | |
|---|---|---|---|
| 2,323,179 | 6/1943 | Hall et al. | 277/28 |
| 2,332,150 | 10/1943 | Huff | 277/15 |
| 2,971,783 | 2/1961 | Laser | 277/59 |
| 3,268,232 | 8/1966 | Richards | 277/59 |
| 3,474,734 | 10/1969 | Stogner | 277/59 |
| 3,606,349 | 9/1971 | Petrie et al. | 277/27 |
| 3,678,809 | 7/1972 | Doutt | 277/71 |

*Primary Examiner*—Robert I. Smith
*Attorney, Agent, or Firm*—Daniel M. Rosen

[57] ABSTRACT

A pressure-medium operated frictionless seal assembly for sealing a gap between two members, coaxially rotatable relative to one another, and including a first ring of rigid material and an additional ring, which rings are insertible into the gap and mountable each against one of two relatively rotatable members coaxially with the axis of rotation. Each ring has at least two annular surface portions coaxial with the axis of rotation, these portions abutting corresponding surface portions respectively on the additional ring and the first ring respectively at least when the sealing device is mounted in the gap but unaffected in other respects. The additional ring is elastically deformable at least at its annular surface portions, two of the annular surface portions one of said rings of at least being spaced apart by an intermediate annular groove. A plurality of channels 9 extend through the first ring and open into the groove for permitting feeding pressure medium to the groove and building up pressure in said groove such that each annular surface portion on the additional ring will be elastically deformed and lifted off from the corresponding annular surface portion on the first ring, thereby formed a narrow annular gap between the rings, through which gap the pressure medium can leak out to the ambient.

19 Claims, 9 Drawing Figures

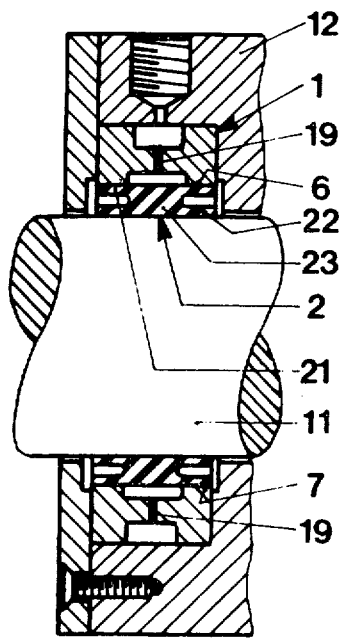
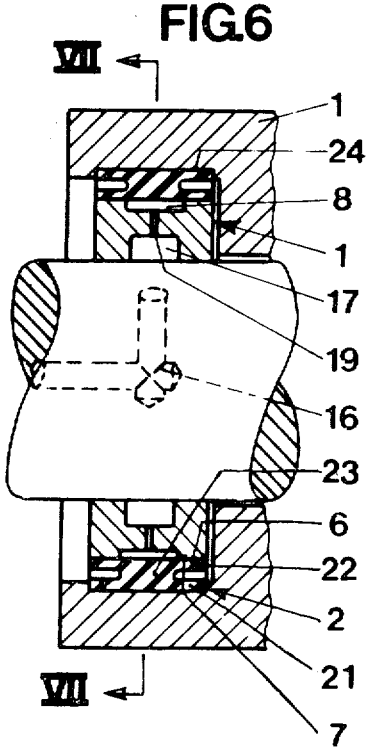
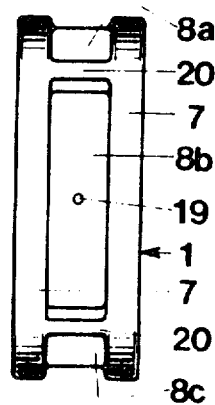
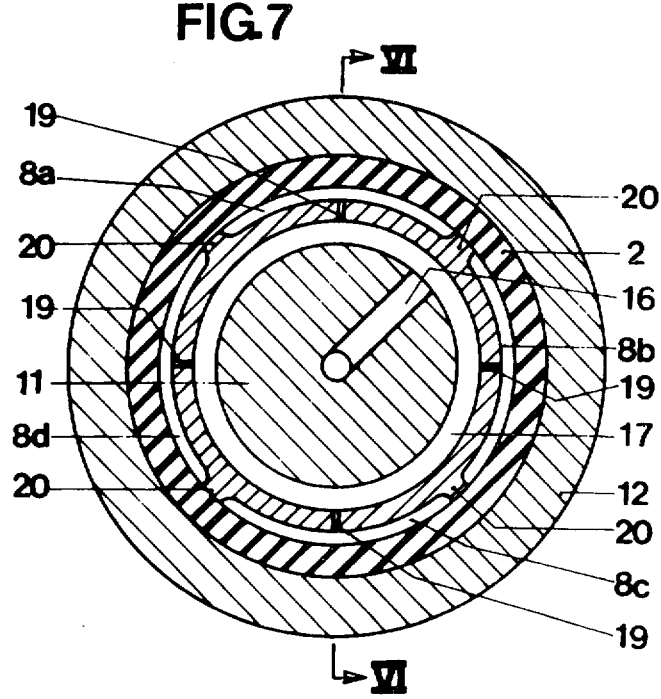
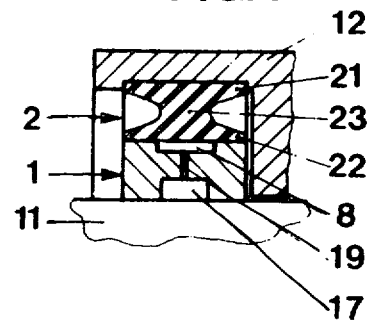
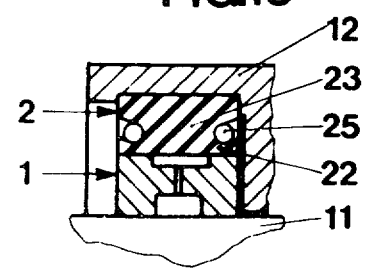

PRESSURE MEDIUM OPERATED FRICTIONLESS SEAL ASSEMBLY

This invention relates to seal assemblies and particularly to seal assemblies for sealing a gap between two members coaxially rotatable relative to one another.

In providing a seal assembly for sealing a gap between two relatively rotatable members, for example a housing and a shaft rotatably mounted therein, it is desirable that such a seal assembly not only provides a good sealing effect when the shaft is stationary as well as when it is rotary relative to the housing, but also can be made frictionless through actuation by means of a pressure medium so as to permit high circumferential speeds, for example about 15 m/s. It is further desirable that such an assembly can be manufactured at a competitive price compared with other sealing devices, particularly in the case of large diameters. It is therefore the prime object to provide a novel and unique seal assembly which achieves the foregoing desirable characteristics.

Further characterizing features and the effects achieved thereby will be apparent from the following more detailed description and accompanying drawings.

FIG. 2 is a partial longitudinal section through a part of a housing and a shaft rotatably arranged in the housing, and shows how the seal assembly according to FIG. 1 can be built in.

FIG. 5 is a partial longitudinal section similar to that shown in FIG. 2 and shows how a second preferred embodiment of the seal assembly can be built in.

FIG. 6 is a similar partial longitudinal section taken along the line VI—VI in FIG. 7 and shows how a third preferred embodiment of the sealing device can be built in.

FIG. 7 is a section along the line VII—VII in FIG. 6.

FIG. 8 is a view of the ring of rigid material included in FIGS. 6 and 7.

FIG. 9 and FIG. 10 are partial longitudinal sections showing two additional preferred embodiments of the sealing assembly according to the invention.

Figure 1:
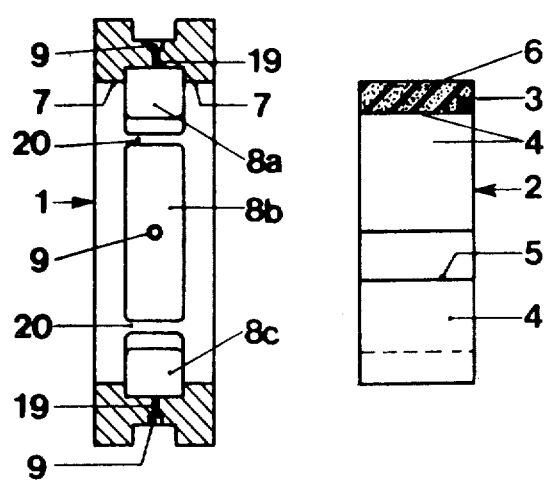
FIG. 1 is a longitudinal section through a first ring of rigid material, and a partial longitudinal section through an additional ring co-acting with the first ring, said rings being comprised in a first preferred embodiment of the seal assembly.
Figure 2:
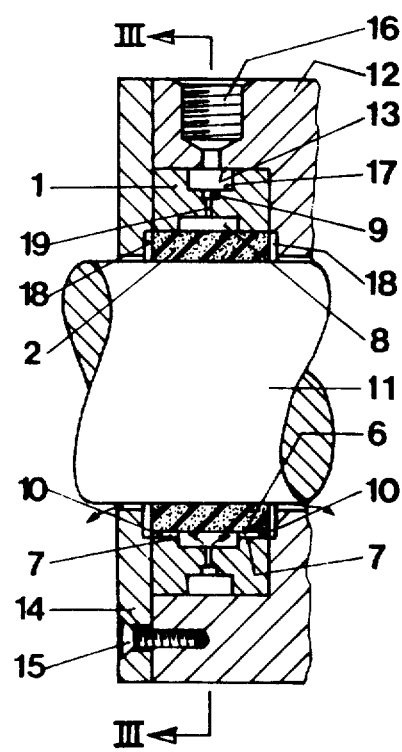

The seal assembly shown in FIG. 1 comprises a first ring 1 of rigid material, for example metal or some rigid plastic material, and an additional ring 2 of an elastically deformable material, for example a rubber-elastic material. The additonal ring 2 shown in FIG. 1, more precisely, consists of a foam-rubber core 3 covered with a non-porous rubber skin 4. The rigid first ring 1 has an inner diameter somewhat smaller than the outer diameter of the additional ring 2, so that after the insertion of the additional ring into the rigid first ring 1, as shown in FIG. 2, the outer peripheral surface of the additional ring 2 abuts the inner peripheral surface of the rigid first ring 1. In this embodiment, thus, the rigid first ring 1 is an outer ring, and the additional ring 2 is an inner ring. The inner ring 2 has a rectangular cross-section, the short sides of which constitute the axial end surfaces of the ring 2. FIG. 1 shows further that, if desired, the inner ring 2, need not be manufactured as a complete ring from the beginning, but may be manufactured as yard goods and cut to a suitable length whereafter the ends are joined together at 5 by vulcanizing, gluing or in like manner to form a ring. This is particularly advantageous in the case of large-diameter shafts and the like. The rigid outer ring 1 has at the outer edges of its inner peripheral surface two annular surface portions 7 coaxial with the ring axis, and the inner ring 2 has surface portions 6 corresponding thereto. The two annular surface portions 7 on the rigid outer ring are spaced apart by an intermediate annular groove 8 provided in the inner peripheral surface of the outer ring. A plurality of channels 9, in the embodiment shown four in number, extend radially through the outer ring 1 and open into the groove 8 for feeding a pressure medium to the groove 8 and building up pressure therein such that each annular surface portion 6 on the inner ring will be deformed elastically and lifted off from the corresponding annular surface portions 7 on the outer ring 1, thereby forming a narrow annular gap 10 between the rings 1 and 2, as shown in the lower part of FIG. 2, through which gap the pressure medium can leak out to the ambient.

Figure 3:
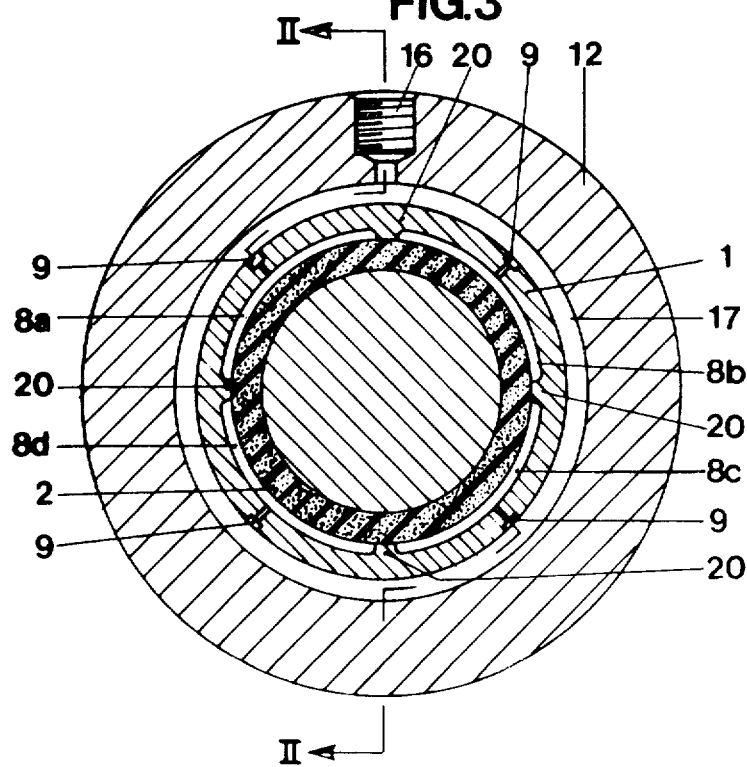
FIG. 3 is a section taken along the line III—III in FIG. 2.

The FIGS. 2 and 3 show how the seal assembly according to FIG. 1 can be built in so as to seal a gap between a rotary shaft 11 and a housing 12 surrounding said shaft. Adjacent the axial end surface of the housing, the shaft bore of the housing is formed as a stepped bore 13, into which the rigid outer ring 1 is fitted. An annular cover 14 is secured to the housing 12 by a plurality of screws 15, one of which is shown, and covers the open side of the stepped bore 13, so that the bore will be transformed into an annular groove concentric with the shaft 11, into which groove the seal assembly is fitted. The inner diameter of the inner ring 2 is somewhat smaller than the outer diameter of the shaft 11, so that the inner ring is sealingly attached to the shaft 11 by press fit. The housing 12 is provided with an inlet 16 for the pressure medium, which inlet opens into an annular distribution channel 17, from which the radial channels 9 extend. In the shown preferred embodiment, the distribution channel 17 is disposed in its entirety in the rigid outer ring 1, but it may, of course, also entirely or partially be placed in the housing 12. The pressure medium may be selected among conventional pressure media, but preferably clean and dry pressurized air or pressurized oil is used although, for example, pressurized water may be used. The pressure medium is pressurized in a pump or the like (not shown) and passed through a conduit (not shown) to the inlet 16 in the housing 12.

When the shaft 11 is stationary relative to the housing 12, and pressure medium is not being fed to the seal assembly, the inner ring 2 abuts the shaft 11 and seals against the same. The two annular surface portions 6 of the inner ring 2 abut the corresponding annular surface portions 7 on the rigid outer ring 1, as shown in the upper part of FIG. 2. Before the shaft 11 is brought to rotate, the seal assembly must be made frictionless by feed of pressure medium. The pressure medium is conducted from the inlet 16 into the annular distribution channel 17, from which it flows through the radial channels 9 into a space, which is defined by the walls of the groove 8 and the inner ring 2 between its two annular surface portions 6. As a result, pressure is built up in the annular groove 8 such that the outer diameter of the inner ring 2, at least at its two annular surface portions 6, is reduced by elastic compression of the ring in radially inward direction whereby a narrow annular gap 10 will be formed between the annular surface portions 6 on the inner ring 2 and the corresponding annular surface portions 7 on the outer ring 1. The pressure medium flows from the annular groove 8 through the two narrow annular gaps 10 out to the ambient. As long as pressure medium is thus being supplied in a sufficient amount, the inner ring 2 and outer ring 1 will be spaced apart by a thin film of pressure medium. The width of the gap 10, i.e. the thickness of the pressure medium film, normally amounts to a few $\mu m$ up to a few hundred $\mu m$, depending primarily on the surface finish of the annular surface portions 6 and 7 and on the pressure medium used and the pressure applied. As the inner ring 2 at radial compression expands axially, annular recesses 18 are provided adjacent the shaft in the housing 12 and cover 14, which recesses permit said axial expansion and also compensate for possible mounting mistakes in axial direction with respect to the inner ring and outer ring of the seal assembly. The seal assembly now is free of friction, and the shaft may be rotated with a circumferential speed as high as desired. There is no risk of the inner ring lifting off the shaft 11, because the inner ring 2 is continuously pressed radially inwards by the pressure medium. Very high circumferential speeds of the shaft 11, however, may require an increase in the pressure of the pressure medium in order to maintain the chosen width of the annular gaps 10.

In order to reduce the pressure medium consumption, it may be suitable to provide flow-restrictors or throttlings 19 is the radial channels in order to maintain an equal pressure in the annular groove 8 along its entire length. Said flow restrictors may be channel sections 19 with a restricted flow area, as shown in FIGS. 1-3, but it also is possible to insert throttle plates or other flow-throttling means in the channels 9.

An additional improvement in the consumption of pressure medium is obtained by arranging transverse partition walls 20 in the annular groove 8, which walls extend from the bottom of the groove 8 up to the level of the annular surface portions 7 and from one annular surface portion to the other. Said partition walls 20 divide the groove 8 into a plurality of groove sections 8a, b, c and d of preferably equal size. For small or relatively moderate diameters of the groove 8, the ring 1 should include at least three, preferably four, such groove sections, but for larger outer diameters preferably a still greater number of groove sections should be used. At least one of the radial channels 9 opens into each groove section such that when the seal assembly is assembled the rings 1 and 2 abut each other, a separate pressure chamber is constituted. Preferably only one channel 9 should be associated with each groove section 8a, b, c and d and open centrally into the pressure chamber.

Figure 4:
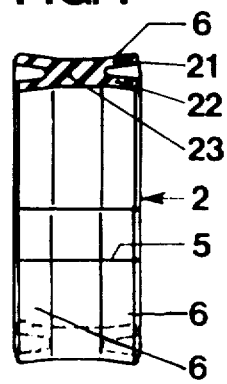
FIG. 4 is a partial longitudinal section through a second preferred embodiment of the additional ring.

In FIG. 4 another preferred embodiment of the elastically deformable ring 2 is shown. The ring 2 has a substantially I-shaped cross-section, with two wide flanges 21 and 22 and a relatively low web 23 connecting said flanges. The flange 21 is an outer flange, the flange 22 is an inner flange, and the web 23 extends radially therebetween. The two annular surface portions 6 on the ring 2 are located on the outer peripheral surface of the outer flange 21 and preferably are slightly inclined towards the web 23 when the ring 2 is not subjected to radial load. The ring 2 may suitably also have a profile, which is mirror-symmetric in relation to a symmetry plane extending transversely through the web 23, so that the inner flange 22 also comprises two annular surface zones located on its inner peripheral surface and inclined inwards towards the web 23. Thereby one and the same ring 2 may be mounted either within a rigid ring 1 and sealingly abut the shaft 11, as shown in FIG. 5, or be mounted externally in relation to the rigid ring 1 and sealingly abut the housing 12, as shown in FIG. 6. The ring 2, furthermore, can advantageously be manufactured as yard goods with the profile shown in FIG. 4 and be cut to a suitable length. The resulting ends can be joined together at 5 by vulcanisation, gluing or the like to form a ring. The ring 2 shown in FIG. 4 is made of rubber, but it is fully possible to manufacture the ring of another suitable material, for example an elastically deformable plastic material.

FIG. 5 shows how a seal assembly, which consists of the rigid ring 1 shown in FIG. 1 and the elastically deformable ring 2 shown in FIG. 4, can be built in so as to seal a gap between a rotary shaft 11 and a housing 12 surrounding said shaft. The assembly according to FIG. 5 shows great similarities with that shown in FIGS. 2 and 3 and, therefore, only the dissimilarities will be dealt with in the following description. The rigid outer ring 1 has been simplified somewhat, in that the radial channels 9 are designed with a restricted cross-sectional area along their entire length.

The thickness of the web 23, as can be seen in FIG. 5, corresponds substantially to the width of the groove 8. The inner diameter of the elastic inner ring 2 is somewhat smaller than the outer diameter of the shaft 11, so that the inner ring 2 is well secured on the shaft 11 with a good sealing thereagainst. The sealing effect is improved by the shape of the inner flange 22 of the inner ring 2 shown in FIG. 4. Upon feeding pressure medium to the sealing device, the outer flange 21 will be deformed radially inward at least at the annular portions 6 and thereby form the narrow annular gap 10, which is not shown in FIG. 5.

When the shaft 11 is brought into rotation the centrifugal force tends to urge the outer flange 21 outward to abut the annular surface portions 7 on the rigid ring 1. If required, a reduction of the width of the narrow annular gap 10 can be prevented by feeding the pressure medium with a higher pressure, in order to ensure the development of a separating pressure medium film between the annular surface portions 7 on the rigid ring 1 and the annular surface portions 6 on the elastically deformable ring 2.

The embodiments of the seal assembly shown in FIGS. 1 to 5 are primarily adapted for sealing a gap between a rotary shaft and a stationary housing surrounding the shaft. The embodiments shown in FIGS. 6 to 10, however, are primarily adapted for use when the shaft is stationary and the housing is rotary. When comparing the seal assembly shown in FIG. 5 with that shown in FIG. 6, one may say that the seal assembly according to FIG. 6 has been obtained as a result of the device according to FIG. 5 in its entirety having been turned inside out.

The seal assembly according to FIG. 6, thus, comprises as previously a ring 1 of a rigid material and an additional ring 2 of an elastic deformable material. The rigid ring 1, however, is now an inner ring and mounted by fit on the shaft 11, while the elastically deformable ring is an outer ring fitted into the housing 12. The stationary shaft 11 is provided with an inlet channel 16 for pressure medium which opens into the distribution channel 17 located in the inner peripheral surface of the rigid inner ring 1. The radial channels 9 extend from said annular distribution channel 17, which are shown with reduced cross-section area along their entire length for effecting suitable throttling, to the annular groove 8, which together with the two annular surface portions 7 is located in the outer peripheral surface of the rigid inner ring and spaces apart said annular surface portions 7 in the axial direction. Also, in this embodiment, the rigid ring 1 preferably is provided with partition walls 20, which divide the annular groove 8 into groove sections 8a, b, c and d in like manner as described above. The elastically deformable ring 2 shows the appearance as in FIG. 4, with the alteration, however, that its two annular surface portions 6 instead of being located on the outer peripheral surface of the outer flange 21 now are located on the inner peripheral surface of the inner flange 22. Said ring 2 is fitted into an annular groove 24, which is provided in the housing 12 and corresponds to the stepped bore 13 in the embodiment according to FIG. 2. Upon feeding pressure medium to the annular groove 8 through the shaft channel 16, the annular groove 17 and the radial channels 9, the annular surface portions 6 of the elastic ring 2 will be lifted, as described above, out of contact with the annular surface portions 7 of the rigid inner ring 1 and thereby form the narrow annular gaps 10, which are not shown in FIG. 6.

When the housing 12 is being brought into rotation on the shaft 11, the inner flange 22 of the outer ring 2 will be deformed due to the centrifugal force, so that the pressure medium supply, if so desired, can be reduced or, if the inner flange 22 is sufficiently weak, be stopped entirely. The fact is, that in certain cases the centrifugal force alone may be sufficient for maintaining the width of the narrow annular gaps 10. This eliminates the risk of the seal assembly being worn out by friction due to momentary interruptions in the pressure medium supply. In most cases, however, it is suitable to maintain a continuous though reduced flow of pressure medium through the narrow annular gaps 10 in order to prevent the entry of impurities.

The inner flange 22 of the elastic ring 2 may in certain cases require increased rigidity in order to prevent the combined effect of pressure medium supply and centrifugal force from widening the narrow annular gap 10 too much. In such cases an elastically deformable outer ring 2 with the appearance shown in principle in FIG. 9 may be used. The increase in rigidity has here been obtained by an increase of the cross-sectional height of the ring 2 in radial direction and by an increase of the thickness of the flanges 21 and 22 toward the web. Another solution of this problem is shown in FIG. 10. The inner flange has here been given such a shape that it is possible to attach two garter springs 25 in the junction between the inner flange and the web.

The above description is to be regarded merely as examples of preferred embodiments of the seal assembly according to the invention, and many modifications of the invention can be imagined within the scope of the following claims. It is possible, for example, but not preferable, to manufacture the ring 2 of an elastically deformable material only at its annular surface portions 6 and the remaining part of the ring of metal or another rigid material. It is possible as well, but not preferable, to vulcanize into the ring 2 stiffening, reinforcing or some other kind of strengthening material, for example a metallic one. The profile of the described radial seal assembly, furthermore, may be turned through 90° and thereby be converted into an axial seal assembly, which utilizes the principles described above.

What is claimed is:

1. A pressure-medium operated frictionless seal assembly for sealing a gap between two members, coaxially rotatable relative one another, comprising a first ring of rigid material and a second ring, said rings being insertible into said gap and mountable each against one of said relatively rotatable members coaxially with the axis of rotation, each one of said rings having at least two annular surface portions, coaxial with the axis of rotation, said portions abutting only respective corresponding surface portions on the other of said rings at least when the sealing device is mounted in the gap, said second ring being elastically deformable at least at the annular surface portion associated therewith, two of said annular surface portions of at least one of said rings being spaced apart by an intermediate annular groove, and a plurality of channels extending through said first ring and opening into said groove for permitting pressure medium to be fed into said groove and building up pressure in said groove such that each annular surface portion on said second ring will be elastically deformed and lifted from the corresponding annular surface portion of said rigid first ring, thereby forming a narrow annular gap between said first and second rings, through which narrow annular gap said pressure medium can leak out to the ambient.

2. A seal assembly as defined in claim 1, wherein each channel includes flow restricting means.

3. A seal assembly as defined in claim 2, wherein said flow restrictor means is a portion of said channel with reduced cross-sectional area.

4. A seal assembly as defined in claim 1, wherein an annular distribution channel, from which said plurality of channels extend, is provided in a surface on said first ring with an orientation opposed in relation to the annular surface portions of said first ring.

5. A seal assembly as defined in claim 1, wherein said intermediate annular groove is provided only in said first ring.

6. A seal assembly as defined in claim 5, wherein a plurality of partition walls extend from the bottom of said groove up to the level of said annular surface portions of said first ring and transversely across said groove from one annular surface portion to the other, thereby dividing said annular intermediate groove into a corresponding number of groove sections, and wherein at least one channel of said plurality of channels opens into each such groove section, so that each groove section together with said second ring forms a separate pressure chamber.

7. A seal assembly as defined in claim 6, wherein said partition walls are equidistantly spaced along the length of said groove.

8. A seal assembly as defined in claim 7 wherein a single channel leads into each pressure chamber and opens centrally into the same, each channel including flow restricting means therein, said flow restricting means being a portion of said channel with reduced cross sectional area, and further including three, preferably four pressure chambers at small groove diameters, and more at larger groove diameters, said second ring being an elastically deformable material, and one of said first and second rings constituting an inner ring and the other an outer ring surrounding said inner ring radially so as to form a radial seal assembly.

9. A seal assembly as defined in claim 6, wherein a single channel of said plurality of channels leads into each pressure chamber and opens centrally into the same.

10. A seal assembly as defined in claim 6, wherein said pressure chambers at small groove diameters are at least three, preferably four, and at larger groove diameters more in number.

11. A seal assembly as defined in claim 5, wherein said second ring has a substantially rectangular cross-section.

12. A seal assembly as defined in claim 5, wherein said second ring has a substantially I-shaped cross-section with two wide flanges and a relatively low web connecting said flanges, the annular surface portions of said second ring being located on a surface of one of said two flanges which is opposed relative to said web.

13. A seal assembly as defined in claim 12, wherein said web thickness corresponds substantially to the width of said annular groove.

14. A seal assembly as defined in claim 12, wherein at least the outer flange surface portions on said second ring, where said annular surface portions are located, have a slight inclination inwards to said web when said second ring is not subjected to load.

15. A seal assembly as defined in claim 1, wherein said second ring is an elastically deformable material.

16. A seal assembly as defined in claim 15, wherein said elastically deformable material is a rubber-elastic material.

17. A seal assembly as defined in claim 15, wherein said second ring has a porous core covered with a non-porous skin.

18. A seal assembly as defined in claim 1, wherein said second ring is joined in at least one place along its circumference.

19. A seal assembly as defined in claim 1, wherein one of said first and second rings constitutes an inner ring and the other ring constitutes an outer ring surrounding said inner ring radially so as to form a radial seal assembly.

* * * * *